(12) United States Patent
Chellappa et al.

(10) Patent No.: US 8,075,958 B2
(45) Date of Patent: Dec. 13, 2011

(54) METHODS FOR PROVIDING THIN HYDROGEN SEPARATION MEMBRANES AND ASSOCIATED USES

(75) Inventors: Anand Chellappa, Albuquerque, NM (US); Thomas R. Vencill, Albuquerque, NM (US); W. Doyle Miller, Albuquerque, NM (US)

(73) Assignee: Intelligent Energy, Inc., Long Beach, CA (US)

(*) Notice: Subject to any disclaimer, the term of this patent is extended or adjusted under 35 U.S.C. 154(b) by 871 days.

(21) Appl. No.: 10/566,334

(22) PCT Filed: Jul. 29, 2004

(86) PCT No.: PCT/US2004/024683
§ 371 (c)(1),
(2), (4) Date: Feb. 9, 2007

(87) PCT Pub. No.: WO2005/026043
PCT Pub. Date: Mar. 24, 2005

(65) Prior Publication Data
US 2007/0180991 A1 Aug. 9, 2007

Related U.S. Application Data

(60) Provisional application No. 60/491,636, filed on Jul. 29, 2003.

(51) Int. Cl.
*B05D 3/06* (2006.01)
*B05D 5/00* (2006.01)
*C21D 1/09* (2006.01)
*B32B 15/01* (2006.01)
*B32B 5/18* (2006.01)
*B32B 15/02* (2006.01)

(52) U.S. Cl. ........ 427/554; 427/556; 427/559; 427/533; 427/229; 427/247; 148/525; 428/34.1; 428/35.8; 428/586; 428/613; 428/669; 428/673

(58) Field of Classification Search ........................ None
See application file for complete search history.

(56) References Cited

U.S. PATENT DOCUMENTS

| | | | |
|---|---|---|---|
| 5,728,960 A | 3/1998 | Sitrick | |
| 5,738,708 A | 4/1998 | Peachey et al. | |
| 6,077,621 A | 6/2000 | Allen et al. | |
| 6,152,987 A | 11/2000 | Ma et al. | |
| 6,214,090 B1 | 4/2001 | Dye et al. | |
| 6,527,833 B1 | 3/2003 | Oyama et al. | |

(Continued)

FOREIGN PATENT DOCUMENTS
EP 1208904 A1 5/2002
(Continued)

OTHER PUBLICATIONS

International Search Report for PCT Application No. PCT/US04/24683.

*Primary Examiner* — Marianne L Padgett
(74) *Attorney, Agent, or Firm* — Baker & Hostetler, LLP (57) ABSTRACT

The present disclosure is generally related to providing thin hydrogen separation membranes coated on porous substrates that are useful in membrane steam reformers and methods for making same. These reformers can be integrated with protein exchange membrane (PEM) fuel cells to form power systems.

39 Claims, 3 Drawing Sheets

U.S. PATENT DOCUMENTS

| | | | |
|---|---|---|---|
| 7,077,889 B2 * | 7/2006 | Chellappa et al. | 96/11 |
| 7,220,699 B2 * | 5/2007 | Chellappa | 502/325 |
| 7,560,170 B2 * | 7/2009 | Chellappa | 428/613 |
| 7,922,781 B2 * | 4/2011 | Chellappa et al. | 48/197 R |
| 2001/0016236 A1 | 8/2001 | Hu | |
| 2004/0244589 A1 | 12/2004 | Bossard et al. | |

FOREIGN PATENT DOCUMENTS

| | | |
|---|---|---|
| JP | 05078810 A2 | 3/1993 |
| WO | WO 00/78434 | 12/2000 |

* cited by examiner

Figure 7 under 35 U.S.C.
METHODS FOR PROVIDING THIN HYDROGEN SEPARATION MEMBRANES AND ASSOCIATED USES This application is a national stage filing under 35 U.S.C. 371 of International Application PCT/US2004/024683 filed on Jul. 29, 2004 which claims priority from U.S. Application No. 60/491,636, filed on Jul. 29, 2003. The entire teachings of the referenced application is incorporated herein by reference. International Application PCT/US2004/024683 was published under PCT Article 21(2) in English.

RELATED APPLICATIONS

This application is related and claims priority to U.S. Provisional Application Ser. No. 60/491,636, filed Jul. 29, 2003 and entitled "Membrane Reformer for Proton Exchange Membrane (PEM) Fuel Cells: Novel Application of Deposition Process for Low-Cost Hydrogen Separation," which is hereby incorporated by reference in its entirety.

BACKGROUND

Proton Exchange Membrane (PEM) fuel cell power systems are currently not available in the open market because of two main factors, namely, (1) the lack of robust and efficient hydrogen generators that produce pure hydrogen and (2) the high cost and low efficiency of PEM fuel cell stack or stacks when run on a reformate of $H_2$ fed to the anode side (PEM fuel cell efficiency=electrical power output/LHV (Lower Heating Value); Hydrogen generator efficiency=LHV of $H_2$ produced/LHV of feed hydrocarbons). Typically, a reformate is composed of hydrogen and diluents such as $CO_2$, $N_2$, hydrocarbons and contaminants such as CO. Although these two factors appear to be independent, they are not. For the same power output, the size of a PEM fuel cell stack that runs on pure hydrogen (>99.9%) can be 30% smaller than a PEM fuel cell stack that runs on a reformate. This is because the most preferred method of operating a PEM fuel cell is to run its anode side "dead-ended", that is, except for an occasional short time purge, all of the hydrogen that enters the anode side of each cell in the PEM fuel cell stack is utilized (dissociated into H+ ions). When a reformate is fed to the anode side of the fuel cell, the anode side has to be operated in a continuous purge mode (on account of the presence of diluents) and cannot be run "dead-ended". Under such conditions, hydrogen utilization is on the order of only 85%, which means that at least 15% of the hydrogen that is produced by the hydrogen generator is practically "wasted" in the fuel cell. This also raises an additional problem of finding ways to utilize this "wasted" hydrogen, for example by burning this hydrogen to generate useful heat. The efficiency of the PEM fuel cell under such conditions is only about 40%. Assuming an efficiency of about 60% for the hydrogen generator (typically about 50 to 70%), the overall system efficiency works to be only about 24% (=40% x60%). It becomes obvious that at these system efficiencies, a PEM fuel cell power system is several times more expensive than an internal combustion (IC) engine (about >$3000/KW vs <about $50/KW, respectively), with no appreciable gains in efficiency. As a result of this, from a technical standpoint, there is no incentive to install PEM fuel cell power systems on a commercial scale.

On the contrary, when pure hydrogen is supplied to a PEM fuel cell, the efficiency of PEM fuel cells can be as high as 60%, resulting in an overall system efficiency of 36%. At these efficiencies, PEM fuel cell power systems become attractive, particularly when associated features such as lower pollution and lower noise are taken into consideration. The viability of PEM fuel cell systems is then reduced to issues related to cost and system reliability.

One method by which hydrogen may be produced for use in a PEM fuel cell utilizes steam reformers to provide hydrogen from a hydrocarbon fuel supply. Other methods such as ammonia cracking, auto thermal reforming, partial oxidation of hydrocarbons also provide hydrogen in the form of a reformate. In order to separate the hydrogen so produced by reformers, a hydrogen separation membrane may be employed, which is comprised of various metals/alloys. A pressure swing adsorption unit (PSA) can also be employed for hydrogen purification Various metals/alloys are known to be permeable to hydrogen and are thus useful as separation membranes. For example, Pd metal and many of its alloys are well known for their ability to dissociate and diffuse hydrogen.

Hydrogen separation membranes can be in the form of thin coatings deposited on porous planar or tubular supports or can be solid tubular membranes (>70 microns in thickness) as sold by Johnson Matthey. The latter are used for purifying hydrogen for the electronic industry but are not suitable for hydrogen purification for fuel cell use. In the former case, one may employ the use of various supports, such as ceramics, steel and other supports/substrates onto which these membranes are disposed. It has been noted that prior art deposition processes provide resultant hydrogen separation membranes which are expensive, inefficient and do not have desirable physical stability and lifetime characteristics.

SUMMARY OF THE INVENTION

One object of the present disclosure is to provide teachings that overcome the problems and disadvantages of prior art deposited membranes by providing novel application/deposition processes that provide hydrogen separation membranes that are typically cost-prohibitive and display poor or inadequate hydrogen transport (i.e. permeation rates).

It is still a further object to provide for hydrogen separation membranes having desirable lifetime and stability characteristics, provided by and in accordance with the teachings of the present disclosure.

It is still a further object of the present disclosure to provide for improved hydrogen production from light hydrocarbons, such as but not limited to propane and/or methane, utilizing an exemplary membrane reformer provided according to the teachings of the present disclosure. Such membrane reformers utilize thin hydrogen separation membranes provided by the methods provided herein. Sulfur-free heavy hydrocarbons (gasoline, kerosene, diesel), oxygenates such as, but not limited to, ethanol, methanol, soy diesel and ammonia may also be utilized for hydrogen production in accordance with the teachings of the present disclosure.

Another object is the utilization of disclosed membranes surface and/or the integration of such membrane surfaces into a membrane reformer having mesochannels provided therein.

In still other aspects, particular PEM fuel cells are provided that include as part of the power generating system a hydrogen generator which contains an integrated hydrogen separation membrane, which facilitates hydrogen generation and hydrogen separation in a single unit.

Another aspect of the disclosure relates to a method for providing a hydrogen separation membrane upon a substrate. The method comprises providing a substrate having at least one surface and disposing upon the at least one surface a composition. A leak-tight coating is then formed utilizing the composition, wherein the leak-tight coating provides permeance of hydrogen therethrough, thereby forming the hydrogen separation membrane upon the substrate. In another embodiment, the forming step is a method selected from, but not limited to a laser direct-write process. In another embodiment, the composition providing the leak-tight coating is comprised of at least one of palladium or palladium alloy. In another embodiment, the substrate is a porous substrate. The substrate can be of any useful geometry, such as being of tubular or planar configuration.

In particular embodiments, the at least one surface is subjected to a surface treatment prior to disposing the composition upon the at least one surface. An exemplary surface treatment includes a polishing step. In another embodiment, a diffusion barrier is provided upon the substrate. In another embodiment, the method further comprises the step of providing the diffusion barrier upon the at least one surface after subjecting the at least one surface to the surface treatment. In still other embodiments, the method further comprises the step of etching the provided diffusion barrier prior to disposing and forming the composition upon the at least one surface to form a leak-tight coating, thereby providing a hydrogen separation membrane upon said substrate.

The etching step employs etching with at least one acid such as nitric acid and/or hydrochloric or pickling solutions. In still other embodiments, the step of polishing the substrate utilizes a method selected from the group consisting of shot peening, ion-beam treatment, deposition of a porous fine layer onto a porous support, for example using chemical vapor deposition (CVD) or physical vapor deposition PVD or using a plasma deposition process. In particular embodiments, hydrogen passing through the hydrogen separation membrane passes through a porous metallic substrate/support.

In still other embodiments, the method further comprises the step of subjecting the disposed composition, which provides the leak-tight coating, to thermal processing. In particular embodiments, thermal processing includes at least one of bake out of organics and sintering of the formed coating. Thermal processing can be conducted in atmospheres having low partial pressure of oxygen (e.g. between about $10^{-2}$ atm and $10^{-5}$ atm) and/or a lean hydrogen atmosphere (e.g. less than about 10% hydrogen by weight) in order to reduce and/or minimize oxidation reactions. In yet another embodiment, the steps of disposing, forming and thermal processing are successively repeated, providing a plurality of layers that form the totality of the leak-tight-coating, whereby the resultant hydrogen separation membrane includes the plurality of layers. In other embodiments, thermal processing includes at least one of bake out of organics and in-situ localized sintering of the disposed composition to provide a leak-tight coating. Localized sintering can be effected using the same technique employed for disposing the composition; it can also be effected by ion beams.

In particular embodiments, the leak-tight coating providing the hydrogen separation membrane, disposed upon the substrate is less than 25 microns thick. In other exemplary embodiments, the leak-tight coating is less than about 20 microns thick, in still others, about 5 to about 10 microns thick.

In another embodiment, the leak-tight coating providing the hydrogen separation membrane, disposed upon the substrate is less than about 15 microns, more preferably less than about 10 microns thick.

Additional embodiments utilize a metallic ink having a metallic component and a carrier component as the composition that forms a leak-tight coating, and hence the hydrogen separation membrane upon the substrate/support. In yet another embodiment, the metallic ink contains at least palladium as a component of the metallic ink. In another embodiment, the metallic component of the metallic ink is provided by an aerosol decomposition process. In another embodiment, the metallic ink has a metallic component that has an exemplary palladium content of about 70 to about 78% by weight of metallic component/portion of the ink. In another embodiment, the metallic ink has a palladium content of about 75 to 77% by weight of the metallic component of the metallic ink.

In another embodiment, the metallic ink is further comprised of silver. Exemplary metallic inks comprise about 25% palladium and silver mix and about 75% carrier, by weight respectively, wherein the palladium and silver mix is provided in a ratio of about 75% palladium to about 25% silver. In another embodiment, the metallic ink comprises about 5% to 50% palladium and silver mix and about 50% to 95% carrier, by weight respectively, wherein the palladium and silver mix is provided in a ratio of about 77% palladium to about 33% silver.

The present disclosure also provides a membrane reformer comprising a thin leak-tight coating disposed upon a substrate, wherein the leak-tight coating transports hydrogen and the thin leak-tight coating is comprised of at least one of palladium, palladium alloys or palladium, silver alloy. In another embodiment, the thin leak-tight coating is formed on a porous substrate. Exemplary porous substrates, include but are not limited to, porous metal substrates. In yet another embodiment, the thin leak-tight coating is formed on a porous metal substrate that has been polished. In particular embodiments, the polished substrate is treated to include a diffusion barrier between the polished substrate and the leak-tight coating. In yet another embodiment, the diffusion barrier is etched. The polishing is accomplished by at least one of shot peening, ion-beam treatment or deposition of a smooth porous coating using plasma methods or by CVD or PVD. In yet another embodiment, the thin leak-tight coating is provided by laser direct-write process. In various embodiments, the thin leak-tight coating has a thickness of less than about 10 microns. In yet another embodiments, the thin leak-tight coating has a thickness of between about 2 to 10 microns.

In yet another embodiment, a membrane reformer comprises a thin leak-tight coating formed utilizing a metallic ink having a metallic component and a carrier component. The metallic component of the metallic ink can be provided by an aerosol decomposition process. In yet another embodiment, the metallic component of the ink is comprised of an alloy having between about 70 to about 78% palladium. In still other embodiments, the metallic component of the ink is comprised of a mix having exemplary characteristics and exemplary ratios of silver and palladium in the metallic component of the metallic ink as disclosed herein.

Other objects of the present invention will be apparent to those of ordinary skill in the art.

DESCRIPTION

Descriptions of exemplary embodiments are provided and reference made to the accompanying figures which form the part thereof, and which are shown by way of illustration of specific embodiments. It is to be understood that other embodiments may be utilized and structural and functional changes may be made without departing from the spirit and scope of the present disclosure.

The foregoing is a description of various embodiments, presented for the purpose of illustration and description. It is not intended to be exhaustive or to limit the invention to the precise form disclosed. Many modifications and variations are possible in the light of the teachings and disclosure provided herein. It is to be understood that all references/articles/disclosures cited herein are incorporated by reference in their entirety.

Thin hydrogen separation membranes and methods for making same are provided herein. Such membranes can be coated/disposed on porous substrates which are useful in membrane reformers. These reformers can be integrated with proton exchange membrane (PEM) fuel cells to form power systems. Exemplary hydrogen generation apparatus and methods for producing hydrogen from various sources (e.g. hydrocarbons, ammonia, etc.) are described in published International Applications WO 02/086987, filed Apr. 23, 2002 and entitled "Hydrogen Generation Apparatus and Method for Using Same" and in WO 02/07145, filed Mar. 4, 2002 and entitled "Ammonia-Based Hydrogen Generation Apparatus and Method for Using Same", both herein incorporated by reference in their entirety. The hydrogen membrane reactor described therein can utilize the hydrogen separation membranes provided by the present disclosure. Features of an exemplary embodiment of a hydrogen membrane reactor are discussed in published application WO 02/086987 and are depicted in FIGS. 2-5 therein, for example. Additional exemplary reformers that utilize hydrogen separation membranes are known to those of ordinary skill in the art, and may utilize the hydrogen separation membranes provided by the present disclosure.

Figure 1:
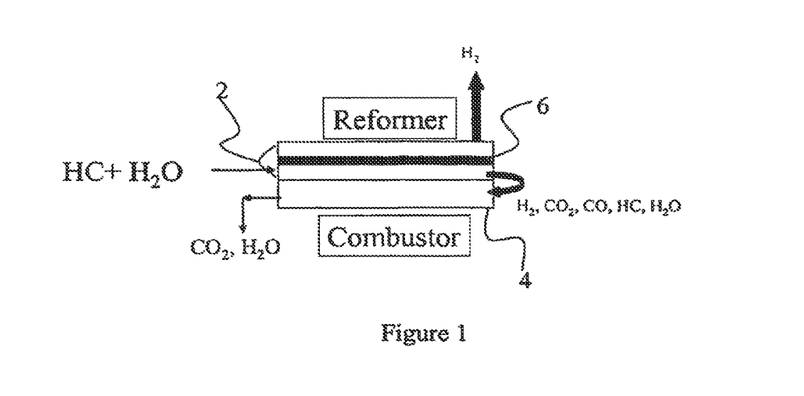
FIG. 1 depicts an exemplary schematic of an exemplary membrane reformer that incorporates a hydrogen separation membrane.

According to one aspect and as depicted in FIG. 1, a steam reformer is herein described, which includes a hydrogen separation membrane. The system consists of three main components, namely: a reactor/reformer 2, a combustor 4, and a hydrogen separation membrane 6. The membrane is selective to only hydrogen in that it does not allow other constituents such as carbon monoxide (CO) or carbon dioxide ($CO_2$) to pass through it. These three system components are integrated in intimate contact with each other, and therefore facilitate high heat and mass transfer rates, which in turn translates to higher processing rates per unit volume and subsequently to a compact and efficient system.

Hydrocarbon fuel, such as, but not limited to, methane, propane, butane, etc (indicated as HC in FIG. 1) is contacted with water (steam) and is fed into the reactor/reformer 2 where hydrogen is produced in the presence of a catalyst. In embodiments where ammonia is utilized as the hydrogen source, water need not be fed. In the absence of hydrogen separation membrane 6, the product gas stream can consist of up to 75% hydrogen on a dry basis, with the remaining constituents being CO, $CO_2$, and un-reacted hydrocarbons. The integration of a hydrogen membrane with the reactor greatly facilitates the selective removal of hydrogen from the reactor, as it is produced, to yield a very pure hydrogen stream (>99.9%) which is then routed to a PEM fuel cell. The availability of this $H_2$ stream leads to increased operating efficiencies of the PEM fuel cell.

Another advantage of a membrane reactor is that the in-situ removal of hydrogen permits higher hydrocarbon conversions at temperatures as low as 600 to 650° C., (Le Chatlier's principle). Operating at these temperatures permits the use of conventional materials of construction and machining/manufacturing practices that lead to lower costs per unit. In contrast, industrial reactors are operated at temperatures greater than 750° C., and require the use of specialty alloys and refractory materials. Exemplary alloys that may be utilized to provide such membrane reactors include, but are not limited to: aluminum, stainless steel (austenitic steels such as Type 304, 316, 321, 330), Inconel®, titanium or other refractory alloys suitable for high temperature applications. Inconel® refers to a family of trademarked high strength austenitic nickel-chromium-iron alloys that have exceptional anti-corrosion and heat-resistance properties. Exemplary alloys include, Inconel 600, 625, and X (trade names).

Figure 2:
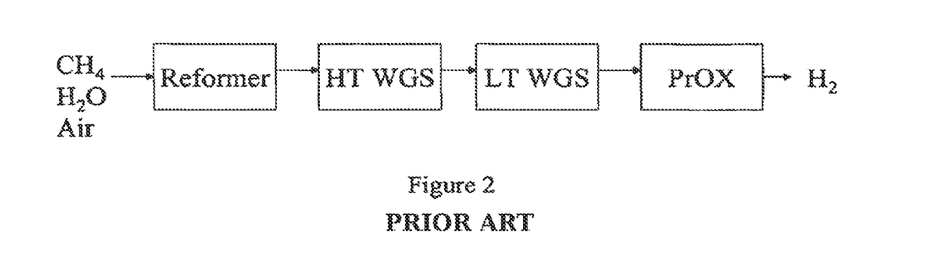
FIG. 2 depicts an exemplary process schematic for hydrogen generation via conventional routes.

For comparison, the process scheme for generating hydrogen by conventional routes is shown in FIG. 2. At the end of the long process train as shown in FIG. 2, the product contains only 35% to 40% hydrogen during autothermal reforming, and less than 75% during steam reforming (HT WGS=high temperature water gas shift, LTGS=low temperature water gas shift, PrOX=Preferential oxidation).

An exemplary reformer is a steam reformer. Steam reforming is an endothermic reaction, and the heat required to run the reaction is supplied by combusting the membrane reject gas stream as shown in FIG. 1. In this way, efficiency is greatly increased, since even waste gases are used to generate heat required for additional hydrogen generation. Mesochannel reactor architecture provides mesochannels having flow dimensions in the 0.3 to 0.5 mm range (for example, see published PCT Applications by Mesosystems Technology Inc, Nos. WO 02/086987 and WO 02/071451, herein incorporated by reference in their entirety), which permits high heat transfer rates from the combustor to the reactor (both of which are in intimate contact) and hence allows for fast response and start-up times.

The incorporation of a palladium based hydrogen separation membrane gives rise to the question of whether the cost of such as system (due to the precious metal cost) would be so exorbitant, that it would render this approach impractical. A palladium based membrane, at a cost of $1/cm², would result in a hydrogen separation membrane that accounts for about 20% of the hydrogen generator cost. However, the cost of such a membrane should always be considered in the context of the PEM fuel cell system cost, and not on the cost of the hydrogen generator alone. This is because the incorporation of a palladium based hydrogen separation membrane would produce pure hydrogen, and as discussed earlier, would subsequently lead to a reduction in PEM cell stack size and costs. A decrease in the size of the process train by itself (FIG. 1 vs. FIG. 2) would offset the cost of the palladium based membrane. Therefore, the major issue with the incorporation of a palladium membrane is not the cost of the palladium metal in the membrane, but rather it is the technical challenges associated with the production of a leak free coating/membrane and the subsequent stability of the membrane under reforming conditions.

Figure 3:
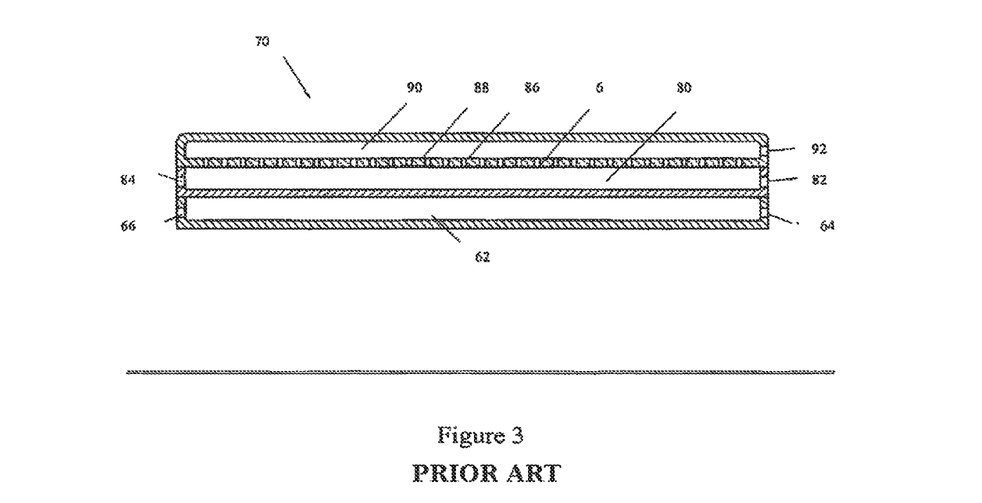
FIG. 3 depicts an exemplary reformer that incorporates the hydrogen separation membranes provided herein.

FIG. 3 is a schematic of an exemplary membrane reformer 100 (utilizing the concept depicted in FIG. 1. FIG. 3 illustrates a membrane reactor (70) that integrates a reactor sub assembly with a combustion chamber (62). Combustion fuel, which can be comprised of a membrane reject stream exiting the reformer, the fuel which is fed into the reformer or an auxiliary fuel that is different from that fed into the reformer and air enters the combustion chamber at the entry port (64) and is converted to $CO_2$ and $H_2O$ while generating heat. The fuel to the reaction chamber (examples, fuel and water in the case of steam reforming of hydrocarbons, ammonia in the case of ammonia cracking) enters the reaction chamber (80) through the entry port (82) and reaction tail gases exit through the port (84). The generated hydrogen permeates through the hydrogen separation membrane (6) and through the membrane support sub assembly consisting of the porous substrate/support (86), the perforated plate (88) to support (86), and into the plenum (90), and exits the unit through the exit port (92). The tail gases from the combustion chamber or combustion product gases exit through the exit port (66).

Exemplary reformers are also disclosed in the cited published PCT applications mentioned above. In the exemplary reformer shown in FIG. 3, a commercially available 75% Pd/25% Ag foil (25 microns in thickness; purchased from Johnson Malthey, http://www.matthey.com/) is sealed using grafoil gaskets that required a flanged unit. The flanges contributed to the 'bulkiness' of the membrane reformer. An exemplary membrane reformer unit was evaluated using methane, propane and sulfur-free kerosene as the test fuels. Hydrogen production rates, hydrogen purity and hydrogen recovery (=hydrogen permeate/hydrogen generated) were measured as a function of temperature, pressure, space velocity and steam to carbon ratio (S/C) of the feed.

Table 1, at an S/C ration of 2.5 and temperature of 575° C., shows the results of methane reforming in the membrane reformer. As can be seen, while operating at 575° C. and 50 to 70 psig, a targeted hydrogen production of 220 sccm was achieved. The purity of the permeate hydrogen was also good as CO levels were less than 100 ppm. Trace impurities of hydrocarbons and CO in the permeate hydrogen may be due to the out-gassing grafoil gasket. As shown in Table 1, (Where psig=pounds per square inch gauge, TOS=Time on Stream, GHSV=Gas hourly space velocity, sccm=standard cubic centimeters per minute, ppm=parts per million), hydrogen recovery increases with increasing pressure.

TABLE 1

| P (psig) | TOS (h) | GHSV ($h^{-1}$) | $H_2$ (sccm) | Recovery (%) | Impurities (ppm) | CO (ppm) |
|---|---|---|---|---|---|---|
| 51 | 0.4 | 1300 | 196 | 34 | 171 | 53 |
| 61 | 16 | 1100 | 237 | 42 | 143 | 47 |
| 72 | 24 | 975 | 272 | 46 | 88 | 46 |

With an aim to increase the hydrogen recovery, the test was continued at 72 psig and 575° C., while changing the S/C ratio and the space velocity.

Table 2 summarizes the results of these tests (T=575° C., P=72 psig.), and as can be seen hydrogen recovery of 63% was measured when then the S/C ratio was 2.25. Decreasing the feed ratio decreases the amount of steam that is present in the reformer, thereby increasing the hydrogen partial pressure and subsequently leads to higher flux and recovery. However, at low S/C ratios, and particularly with hydrogen removal, the tendency to form carbon deposition in the reformer increases, necessitating a trade-off between catalyst stability and hydrogen recovery.

TABLE 2

| S/C | TOS (h) | GHSV ($h^{-1}$) | $H_2$ (sccm) | Recovery (%) | Impurities (ppm) | CO (ppm) |
|---|---|---|---|---|---|---|
| 2.5 | 100 | 772 | 196 | 34 | 171 | 53 |
| 2.25 | 16 | 652 | 237 | 42 | 143 | 47 |

The reformer was run continuously for 100 hours at a S/C ratio of 2.5. During this period, a HPower fuel cell was powered using the hydrogen produced from the membrane reformer.

While pure hydrogen production has been demonstrated using a membrane reformer that contains a commercially available 25 micron thick Pd/Ag membrane, the hydrogen production rates at the operating conditions around <650° C., <80 psig, S/C=2.5 to 3.0 is severely restricted by the thickness of the Pd/Ag hydrogen separation membrane. For example, while processing methane, hydrogen (permeate) was produced at the ratio of approximately only 1 to 1.2 moles of hydrogen per mole of methane, which is well below the stoichiometric ratio of 3.0. Since at a given temperature, differential pressure and feed composition, hydrogen permeation is inversely proportional to membrane thickness, reducing the membrane thickness would improve the performance of membrane reformers and realize the benefits of higher hydrocarbon conversions at lower temperatures (via Le Chatlier's principle). Pd/Ag foils of thickness less than 25 microns are not readily available; and when available are priced at an exorbitant $10-15/$cm^2$ (15 micron thick foil, Goodfellow).

In order to provide the thin hydrogen separation membranes (less than 25 microns) in accordance with the teachings of the disclosure, various steps and processes are provided. Exemplary hydrogen separation membrane composition deposition/formation, compositions including metallic inks, substrate selection and treatments, thermal processing and resultant useful membranes, comprised of thin leak tight coating(s), are described below.

According to one aspect of the present disclosure, deposition of a thin (≦about 10 microns thick) Pd/Ag coating on porous metal substrates using a low cost and manufacturable laser direct-write process provides a hydrogen separation membrane. Additional details regarding exemplary Pd/Ag inks, metallic ink production and content, exemplary substrates and treatments, coating process are provided below.

As described herein and as one example, methods for providing exemplary thin Pd/Ag coatings that provide hydrogen separation membranes of thickness preferably less than 10 microns, are provided. Furthermore, such membranes are provided utilizing techniques that are rapid and manufacturable (in contrast to techniques such as electroless plating), and are useful for deposition of such coatings on porous metal substrates (instead of the commonly studied ceramic substrates, for example). Metal substrates offer the advantages of straightforward integration into various reformers (using techniques such as welding) and improved stability of the membrane during thermal cycling. Exemplary metal substrates/supports onto which hydrogen separation membranes are formed utilizing thin leak-tight coatings are discussed below. Methods taught herein can also be utilized to provide desired membranes upon ceramic substrates as well.

Exemplary hydrogen separation membranes of appropriate thickness are obtainable via various methods disclosed herein. In particular embodiments, direct-write techniques are useful, previously being utilized for maskless coating of components in the electronics industry. The surface characteristics of deposited membranes can be assessed utilizing scanning electron microscopy (SEM). Compositional information as a function of membrane thickness can be determined using electron probe microanalysis (EPMA) or X-ray photoelectron spectroscopy (XPS).

Various metals/alloys are known to be permeable to hydrogen and are thus useful, when suitably coated upon suitable substrates, as hydrogen separation membranes. For example, Pd metal and many of its alloys are well known for their ability to dissociate and diffuse hydrogen. For Pd metal itself, the diffusion of hydrogen and the kinetics of surface processes have been widely studied and modeled [see T. L. Ward and T. Dao, "Model of hydrogen permeation behavior in palladium membranes", J. Mem. Sci. 153, 211-231 (1999).]. A variety of alloys also have high permeability to hydrogen, alloys typically displaying superior mechanical properties [G. J. Grashoff, C. E. Pilkington and C. W. Corti, "The purification of hydrogen", Plat. Met. Rev. 27(4), 157-169 (1983); A. G. Knapton, "Palladium alloys for hydrogen diffusion membranes", Plat. Met. Rev. 21, 44-50 (1977).]. In particular, some alloys alleviate α-β phase transformation that leads to structural distortion and embrittlement. Alloys of Pd and Ag have been the most widely studied, largely because they form a solid solution over the entire composition range, and exhibit a maximum in hydrogen permeability at compositions near 75% Pd/25% Ag [G. J. Grashoff, C. E. Pilkington and C. W. Corti, "The purification of hydrogen", Plat. Met. Rev. 27(4), 157-169 (1983); A. G. Knapton, "Palladium alloys for hydrogen diffusion membranes", Plat. Met. Rev. 21, 44-50 (1977); G. Holleck, "Diffusion and solubility of hydrogen in palladium and palladium-silver alloys", J. Phys. Chem. 74(5), 503-511 (1970)].

In one example, useful Pd/Ag powders for use to make inks, are prepared utilizing various techniques including aerosolization and thermal decomposition of salt precursors. Inks are also obtainable from (MRA Laboratories; Adams, Mass.) which may be cheaper route to inks than an aerosolization process. A 75% Pd/25% Ag composition was used for aerosol-derived powders. Exemplary commercial metallic inks containing palladium having a 70% Pd/30% Ag mix are readily available. Preferable inks contain about 77% Pd/23% Ag, by weight, of the metallic component of the ink. Literature indicates that the permeability for the 70/30 composition may be approximately 30% of that for a 75/25 composition (G. J. Grashoff, C. E. Pilkington and C. W. Corti, "The purification of hydrogen", Plat. Met. Rev. 27(4), 157-169 (1983)), though other data indicate a less strong composition dependence (G. Holleck, "Diffusion and solubility of hydrogen in palladium and palladium-silver alloys", J. Phys. Chem. 74(5), 503-511 (1970)).

As previously mentioned, useful exemplary Pd/Ag inks are produced from 75% Pd/25% Ag alloy powders using an aerosol decomposition process. The basic equipment and procedures of this method have been described elsewhere (T. C. Pluym, S. W. Lyons, Q. H. Powell, A. S. Gurav, T. T. Kodas, L. M. Wang and H. D. Glicksman, "Palladium metal and palladium oxide particle production by spray pyrolysis", Mat. Res. Bull. 28, 369-376 (1993)). For these powders, a TSI 3076 atomizer or ultrasonic aerosol generator (modified home humidifier) is used to generate an aerosol from a precursor solution. The aerosol droplets are carried by $N_2$ gas through a three-zone furnace set at 900° C. In the furnace, precursor decomposition, particle densification, metal alloying and crystallization take place. The reacted particles are then collected on a membrane filter. The precursor solution consists of aqueous palladium nitrate and silver nitrate, dissolved to give a final concentration of 0.1 M in $Pd(NO_3)_2$ and 0.333 M $AgNO_3$. A carrier flow rate of about 2 liters/min and furnace tube diameter between about 1 to 5 inches provides a residence in the heated zone of approximately 2 min. Several different synthesis temperatures were initially explored before settling on 900° C. 900° C. was chosen because it provided a crystalline single-phase Pd/Ag alloy powder, with no evidence by X-ray diffraction (XRD) of PdO (Powders were produced with two different aerosol generators (TSI 3076 and ultrasonic atomizer). Because of higher production rates, most of the inks were produced using the ultrasonic generated powder, which possessed an approximate mean particle diameter of 0.7-0.8 μm.

α-terpineol is an exemplary solvent for use in ink formulation with the aerosol powders, based on reports of similar usage in the literature (K. Nagashima, T. Himeda, and A. Kato, "Properties of conductive films made from fine spherical silver-palladium alloy particles", J. Mater. Sci. 26, 2477-2482 (1991); K. Nagashima, M. Wada, and A. Kato, "Preparation of fine Ni particles by the spray pyrolysis technique and their film forming properties in the thick film method", J. Mater. Res. 5(12), 2828-2834 (1990).

A useful aerosol-derived powder comprises 25 wt % Pd/Ag powder: 75 wt % α-terpineol. The powder was a composition of 75% Pd/25% Ag. In addition, commercial Pd/Ag ink is also useful (as-received, vendor specifications): 49.4 wt % powder (metal). Metal particles here are at 70% Pd/30% Ag (vendor provided). The ink was obtained from MRA Laboratories (Adams, Mass.), as previously mentioned. Inks that contain 75-77% Pg/23-25% Ag are also useful, as the increased content of palladium shifts the relevant oxidation window to a higher temperature (about 400° C. to 750° C. for 75% Pd), thus minimizing Pd/Ag oxidation during sintering and bake out of carrier components. Appropriate temperatures and soak times are identified using thermal gravitational analysis, establishing appropriate burn out protocols that also minimize carbon formation.

Suitable diluents include and can comprise α-terpineol to give suitable viscosity for good ink behavior.

Particles from the (MRA Lab) supplied ink were analyzed and found to be spherical as well as disc-shaped submicron particles of relatively narrow distribution. These commercially obtainable particles appear to have morphology that is relatively similar to the aerosol-derived powder described above. Data provided by the manufacturer indicates a nanocrystalline alloy of these particles.

Figure 5:
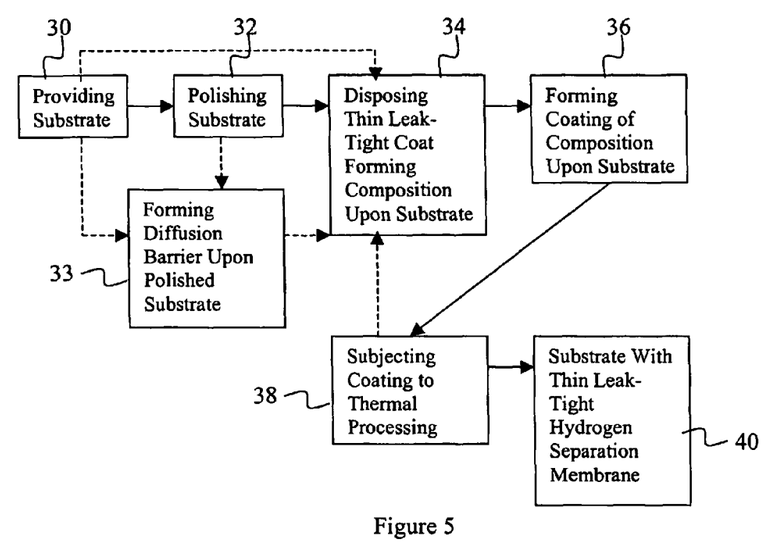
FIG. 5 is an exemplary flow diagram depicting exemplary steps for forming thin hydrogen separation membranes in accordance with the present disclosure.

The aerosol-derived inks can be used to deposit single or multiple layers of Pd/Ag coating to from hydrogen separation membranes on a porous substrate, such as coarse stainless steel supports, such as SS316, SS316L and SS304, for example ("as is" from vendor) and ion beam treated supports, described below, for example. Particularly useful substrates/supports include Inconel 600 and Hastelloy X, which are resistant to thermal cycle sintering and are also amenable to various surface polishing treatments, including ion beam treatments/polishing. In particular embodiments, the sequential and repetitive disposition, forming and thermal processing of a composition upon a desired substrate will provide for a leak-tight coating. In general, a treatment is applied to a substrate, which is then coated with a hydrogen separating composition, which may then be treated, if necessary to provide desired permeance characteristics. In FIG. 5, an exemplary flow of steps outlines one embodiment whereby a substrate is provided with a thin leak-tight coating that is useful as a hydrogen separation membrane. Particular dotted lines in FIG. 5 indicate steps that may be repeated and/or skipped. For example, particular pathways provide for successive layers of thin leak-tight coat forming compositions, while others incorporate or leave out steps such as polishing and formation of diffusion barriers. In particular embodiments, thermal processing includes at least one of bake out of organics and in-situ localized sintering of the disposed composition to provide a leak-tight coating. Localized sintering can be effected using the same technique employed for disposing the composition; it can also be effected by ion beams.

During the preparation of hydrogen separation membranes, the various metallic inks that are to be deposited upon the relevant support are subjected to thermal processing after application to the substrate. During this thermal processing (e.g. sintering, organics bake out, or elevated temperature hydrogen permeation measurement) of Pd alloys, care is taken with respect to exposure of the metal to $H_2$ or $O_2$ at elevated temperature. Pd-based alloys should not be exposed to $H_2$ at temperature below approximately 300° C. to avoid the catastrophic $\alpha$-$\beta$ phase transformation (G. J. Grashoff, C. E. Pilkington and C. W. Corti, "The purification of hydrogen", Plat. Met. Rev. 27(4), 157-169 (1983); A. G. Knapton, "Palladium alloys for hydrogen diffusion membranes", Plat. Met. Rev. 21, 44-50 (1977); J. Shu, B. P. A. Grandjean, A. Van Neste, S. Kaliaguine, "Catalytic palladium-based membrane reactors: a review, Can. J. Chem. Eng. 69, 1036-1060 (1991)). This temperature limit is reduced for many alloys.

The issues with oxygen exposure relate to the temperature/oxygen partial pressure conditions where PdO forms, and the substantial lattice expansion associated with oxide formation. Oxidation followed by reduction is known to leave residual voids in the Pd. Metallic Pd begins to oxidize to PdO in air at approximately 200° C., with oxidation becoming essentially complete between 400 and 500° C. (S. S. Cole, Jr. "Oxidation and reduction of palladium in the presence of silver", J. Am. Ceram. Soc. 68 (4), C106-C107 (1985)). PdO then decomposes back to metallic Pd in air at approximately 850-900° C.

1353 (1991)). These temperatures are lowered roughly 20-30° C. for 30% Ag in Pd. The "window" for PdO formation and decomposition is also a function of the $O_2$ partial pressure ($P_{O2}$). Less detailed information is available for atmospheres other than air; however, the temperature of PdO decomposition (more accurately, Pd—PdO equilibrium temperature) has been measured at a function of $P_{O2}$. For air, this equilibrium temperature is approximately 800° C.; for $P_{O2}=10^{-2}$ atm (as found in a normal $N_2$ cylinder) it is about 690° C.; and for $P_{O2}=10^{-5}$ atm (typical UHP $N_2$, it is about 500° C.) (S. F. Wang and W. Huebner, "Thermodynamic modeling of equilibrium subsolidus phase relation in the Ag—Pd—$O_2$ system", J. Amer. Ceram. Soc. 74(6), 1349-1353 (1991)). In hydrogen separation membrane processing, it is preferable to minimize Pd exposure to even low $P_{O2}$ within the temperature window of oxide formation, although brief oxidation has been reported to activate Pd membranes for $H_2$ permeation, presumably by removal of surface contaminants.

Now turning to the substrates/supports. The hydrogen separation membranes provided by thin leak-tight coatings described herein can be disposed upon on a variety of substrates/supports. One exemplary type substrate/support are porous metal substrates (support and substrate refer to the material onto which compositions, such as the metallic ink compositions described herein, are disposed to provide a hydrogen separation membrane). Such substrates may be utilized "as is" or be subjected to various surface treatments, such as polishing, for example. Other useful supports include composite stainless steel mesh discs, (obtained from Martin Kurtz, Mineola, N.Y.), and composite supports containing an ultrafine $TiO_2/Al2O_3$ particle layer (particle size ~0.1 micron) on top of coarse porous stainless (316L) base, obtained from Truemem, International (Bellingham, Wash.) can also be utilized as supports/substrates, in accordance with the teachings disclosed herein. Ceramic supports such as alumina-based supports as provided by Coors Ceramics, Ceramem Corporation, Ecoceramics can also be utilized.

Exemplary porous stainless steel supports, include, but are not limited to, 0.75 inch outer diameter (O.D.) (0.2 micron filter grade), obtainable from Mott Porous Metals or Pall Corporation. Exemplary metals are provided below.

TABLE 1

| | | Mott Porous Metal (316LSS) Data | | | | | | | |
|---|---|---|---|---|---|---|---|---|---|
| | | Nominal micron | | | | | | | |
| | | 0.2 | 0.5 | 1 | 2 | 5 | 10 | 20 | 40 | 100 |
| 1 | Thickness, inch | 0.023 | 0.05 | 0.047 | 0.060 | 0.061 | 0.061 | 0.061 | 0.080 | 0.110 |
| 2 | Density, g/cc | 7.31 | 5.83 | 5.53 | 5.04 | 4.91 | 4.65 | 4.26 | 4.00 | 3.35 |
| 3 | Porosity, % | 6.76 | 25.7 | 29.47 | 35.8 | 37.4 | 40.8 | 45.7 | 49.0 | 57.3 |
| 4 | Permeability Darcy Value | 0.025 | 0.103 | 0.220 | 0.666 | 1.27 | 4.63 | 12.6 | 24.1 | 126 |

(1) Darcy value of 1.0 = represents a flow of 1 cc of IcP (viscosity) fluid in 1 second at 1 atmospheric pressure through a 1 cm2 × 1 cm thick section of porous media;
(2) Porosity = ratio of pore volume to total superficial volume;
(3) Nominal micron size = average particle size that can be retained by porous metal (typically used as filters to remove particles from air/water).
Pd/Ag hydrogen separation membranes are deposited on the "as-is" supports as well as on polished supports.

(S. S. Cole, Jr. "Oxidation and reduction of palladium in the presence of silver", J. Am. Ceram. Soc. 68 (4), C106-C107 (1985); S. F. Wang and W. Huebner, "Thermodynamic modeling of equilibrium subsolidus phase relation in the Ag—Pd—$O_2$ system", J. Amer. Ceram. Soc. 74(6), 1349-

Polishing is accomplished by subjecting the supports to ion-beam surface treatment, a low-cost technique that lends itself well to scale-up and manufacturability. Ion beam treatment of support surfaces was done at QM Technologies (Albuquerque, N. Mex.). Various alternative mechanical steps for polishing substrate/support surfaces such as, for example, shot-peening, deposition of a smooth porous coating using a plasma or by CVD or PVD may also be utilized to polish the surface of porous metal substrates upon which hydrogen separation membranes are to be deposited. During ion beam treatment, a high energy, pulsed ion beam (hydrogen ions) impinges on the surface for a short period (typically 150 ns), and rapidly melts the surface of the substrate to a depth of only a few microns. Upon removal of the ion-beam, the melted top layer is rapidly cooled (freezes), and as a result, the bulk properties of the substrate remain unchanged.

In particular embodiments, and prior to deposition of exemplary metallic inks onto the various supports, an oxidation treatment was used for three types of stainless steel supports (coarse Mott supports {as provided by vendor}, ion beam treated Mott supports, and woven mesh (above) to provide a diffusion barrier between the stainless steel and metallic palladium layer during subsequent high-temperature sintering steps needed to densify and mend the Pd layer. One exemplary oxidation treatment is outlined in a U.S. Pat. No. 6,152,987 to Ma et al., herein incorporated by reference in its entirety. The treatment involved a soak for 4 hr. at 900° C. (in air), with a 3° C./min ramp up and down.

Alternative methods for providing a desired diffusion barrier include sputtering a fine layer of titanium nitride or tungesten (J. Shu, A. Adnot, B. P. A. Grandjean, S. Kaliaguine, "Structurally stable composite Pd—Ag alloy membranes: Introduction of a diffusion barrier", Thin Solid Films, 286, 72-79 (1996).; V. M. Gryaznov, O. S. Serebryannikova, Yu. M. Serov, "Prepartion and catalysis over Pd composite membranes" Appl. Catal. A: General, 96, 15-23, 1993.) on the porous metal substrate prior to deposition of the coating/hydrogen separation membrane compositions, such as the palladium containing metallic inks described herein. These coatings can be deposited using ionic plasma deposition as practiced by Ionic Fusion (Longmont, Colo.). In another embodiment, a deposited porous ceramic layer may also be utilized to provide a diffusion barrier as described above ($TiO_2/Al2O_3$).

The coarse (unpolished) stainless supports and ion beam treated Mott supports underwent significant and proportionately similar drops in permeance with oxidation, indicative of sintering of the porous stainless steel. In contrast, the stainless woven mesh supports have initial permeance only slightly higher than the coarse Mott supports, but experienced very small permeance reduction with oxidation, indicating that the mesh structure is more stable to sintering. It is also contemplated that a composite ceramic-modified support, such as those provided by Trumem International would also be useful. Such supports provide a ceramic substrate layer, of about 1 to 2 mm thick over the course metallic support, and provide a layer of submicron particles, and provide a much smaller pore size and more uniform surface than the underlying coarse support. In such supports, the ceramic substrate layer itself would function as the diffusion barrier, thus oxidation will not be required. Localized ion and/or laser beam sintering is utilized to treat the membrane disposed thereon, were localized sintering is of the coating and not an underlying support.

Figure 6:
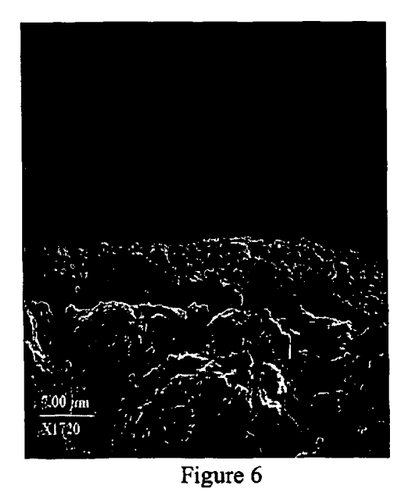
FIG. 6 is a cross-sectional view scanning electron micrograph of an exemplary hydrogen separation membrane deposited by a laser direct-write process (three coats with 850° C. $N_2$ sinter in between each coating) on ion beam polished support, followed by final sinter at 900° C. in ultra high pure $N_2$.
Figure 7:
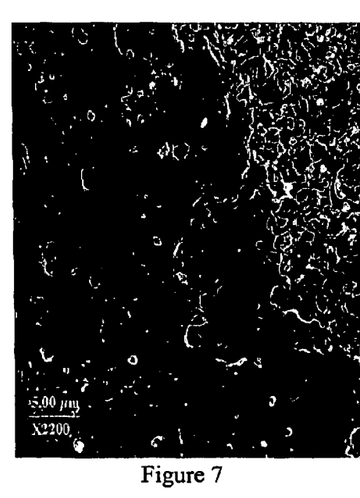
FIG. 7 is a plan view of the exemplary membrane of FIG. 6.

The permeances for "support" (S) and "support+membrane" (S+M) can be calculated directly from experimental data, and permeance for the membrane layer itself can then be calculated from the relationship:

$$\frac{1}{L_{S+M}} = \frac{1}{L_S} + \frac{1}{L_M}, \quad (1)$$

where L is the permeance. Here, "permeance" refers to a permeation rate normalized per unit area of membrane and the pressure difference, but not normalized to the membrane thickness (which is often not well known for supported membranes). Examples of units for permeance are: $sccm/cm^2$-psi, $m^3/m^2$-s-Pa, $mol/m^2$-s-Pa Thin Pd/Ag coating providing hydrogen separation membranes of thickness in the about 5 to 10 micron range were deposited on porous metal substrates using a laser direct-write process. This laser direct-write process is manufacturable and lends itself well to high volume production, as evidenced by its widespread use in the electronic industry as a circuit production methodology. The laser direct-write approach offers uniform edge-to-edge deposition, with excellent thickness control in the about 2-10 micron range. Coatings provided by the laser direct-write process display good contact with underlying porous metal support and no adherence (or flaking) problems arise. While coating with the direct-write process on the ion-beam treated (polished) stainless steel supports, a leak-tight coating was achieved with 3-cycles, with the thickness of the coating being 5-6 microns. SEM micrographs of a direct-write coated sample are shown in FIGS. 6 and 7 (cross sectional and plan views, respectively).

Additionally, these thin membranes are leak-tight (nitrogen permeance less than 0.5e-9 $m^3/m^2$.s.Pa) when tested at room temperature and up to 70 psig pressure, despite the somewhat microporous structure seen in the cross section (FIG. 6).

One example of a useful laser direct-write approach for depositing metallic membranes in accordance with the teachings presented herein is Matrix Assisted Pulsed Laser Evaporation. Matrix Assisted Pulsed Laser Evaporation (MAPLE) is a laser deposition technique that was developed by Potomac Photonics, Inc. (PPI) (Lanham, Md.). In one exemplary method of utilizing this MAPLE deposition technique, organic molecules (although not limited to deposition of organics) to be deposited onto a substrate are first dissolved in a solvent matrix material to form a dilute solution. When a low fluence short pulse UV laser strikes a target onto which this solution is disposed, the laser warms and vaporizes the solvent locally and releases the organic molecules. MAPLE is an energetically soft process, which can deposit a wide range of materials (such as metal, polymer, and ceramic) onto polymeric, metallic, and ceramic substrates. MAPLE Direct-Write (MAPLE-DW) combines the advantages of Laser Induced Forward Transfer (LIFT) and MAPLE to produce a novel laser-driven process to direct-write patterns.

Figure 4A:
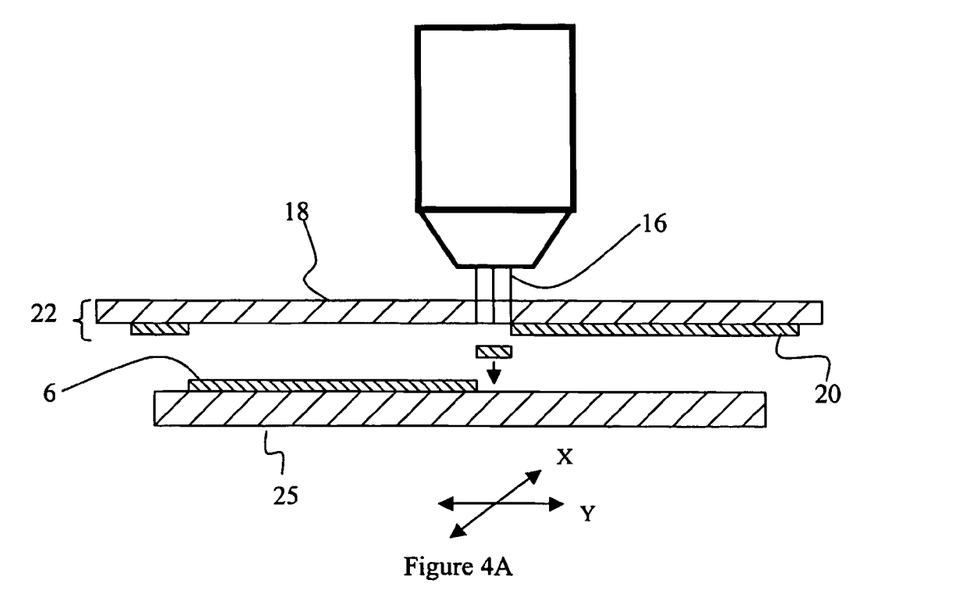
FIG. 4A is a schematic diagram of an exemplary laser direct-write process for depositing a composition upon a substrate to form a thin hydrogen separation membrane thereon.

A typical MAPLE-DW system is illustrated in FIG. 4A. A dilute solution comprising material (e.g. an ink solution including metals/alloys and a carrier) to be deposited and a liquid carrier is dispersed onto an optically transparent backing 18 to form a thin film. This results in a "ribbon" 22, which is analogous to a typewriter ribbon. A shaped laser beam 16 strikes the dilute solution 20 from the back through the transparent backing 18 and causes rapid evaporation of the liquid/carrier component of the dilute solution at the ribbon interface, which propels the material to be deposited towards a receiving substrate 25. The ribbon is placed in close proximity (about 20 to 120 μm, more preferably 25 to 100 μm) and parallel to the receiving substrate 25. Patterning, if desired, can be achieved by moving receiving substrate 25, scanning the laser beam 16, or a combination of both in a relative axis, here shown in the X and/or Y axis. The thickness of the thin film thus deposited could be built up by successive depositions. The schematic provided in FIG. 4 is exemplary and illustrative and should not necessarily be taken to be to scale.

Figure 4B:
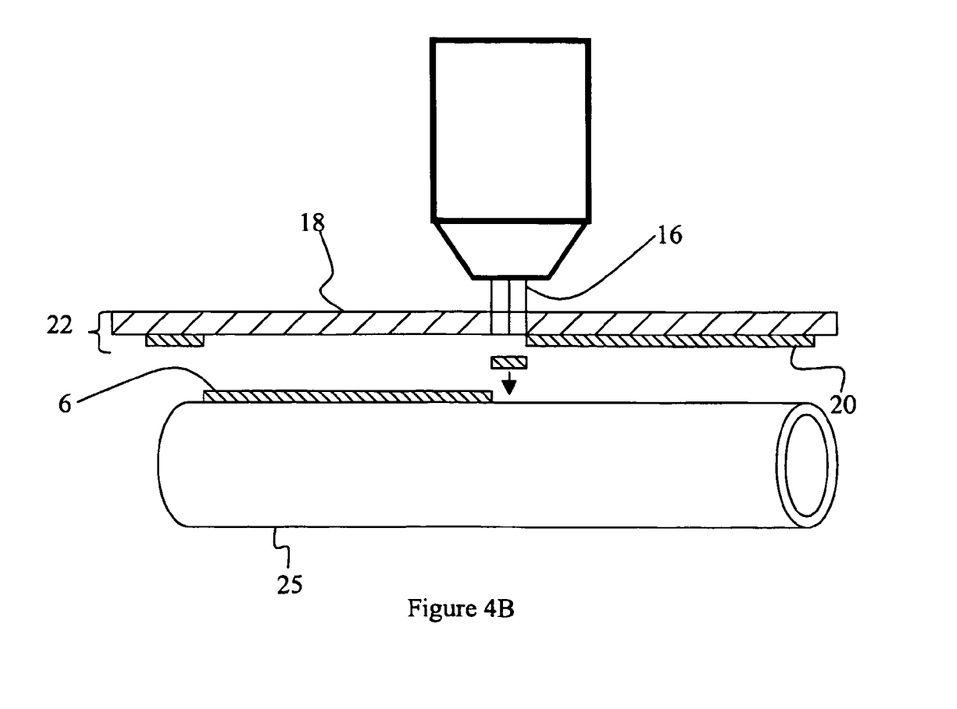
FIG. 4B is a schematic diagram of an exemplary laser direct-write process for depositing a composition onto an exemplary cylindrical/tubular substrate to form a thin hydrogen separation membrane thereon.

In particular embodiments, a laser direct-write method, such as MAPLE-DW, is utilized to deposit a composition onto a cylindrical or tubular porous substrate (FIG. 4B). FIG. 4B is illustrative, and depicts formation of hydrogen separation membrane 6 onto substrate 25 in a "sectional" view. In an exemplary embodiment, dilute solution 20 (e.g. an Pd-containing composition) is disposed onto and covers the outer surface of the cylindrical or tubular porous substrate. In this example, collectable hydrogen permeates through deposited hydrogen separation membrane 6, through the porous tubular substrate and into the conduit provided thereby.

Another advantage of the MAPLE-DW is that it combines both additive and subtractive capabilities. Once the ribbon is removed, the laser used to transfer the disposed material (such as the Pd-based metallic inks discussed herein, for example) can also be used for patterning the materials deposited, as well as other tasks like micromachining traces, dicing circuits, and trimming, which are useful properties of the set-up for shaping and modifying the hydrogen separation membranes provided by the present teachings.

Pd/Ag coating and deposition is accomplished utilizing MAPLE-DW to deposit hydrogen separation membranes on metal substrates, preferably polished utilizing ion beam polishing. In on embodiment, Pd/Ag ink (70-78% Pd/30-22% Ag) using MAPLE-DW is deposited onto 19 mm O.D. stainless steel substrates to obtain a thin (~10 μm), leak tight coating. Pd/Ag paste 70% Pd/30% Ag is further thinned, utilizing a suitable solvent such as α-terpinol, for example, to achieve a desired transfer result. During the transfer process, the spacing between the "ribbon" and the substrate was controlled by a spacer to provide exemplary spacing as described above. In this embodiment, six successive transfers were performed to achieve a dense coating. The wet thickness of coating was measured to be around 15 μm. The substrates with the MAPLE-DW Pd/Ag ink disposed were then soft baked at 150° C. in air to bake out the organic solvent that was added to facilitate the transfer process. The substrates were subsequently placed inside a Lindberg tube furnace for the final sintering at 850° C. A constant nitrogen flow at 15 psi was introduced during sintering to avoid oxidation of the Pd. Ion beam treated porous stainless steel samples were etched by dipping in nitric acid solution, or typical pickling solutions, such, but not limited to 5 to 10 vol % sulfuric acid or sodium acid sulfate or nitric acid containing fluoride ions, for 15 to 120 seconds prior to coating. Such etching provides surface roughness to provide better adhesion of the coating of metallic components of the metallic inks to the substrate surface or, if so provided, to a diffusion barrier layer provided upon the substrate surface. Deposition of a Pd/Ag coating on stainless steel mesh supports using the MAPLE-DW technique is also possible as well onto tubular surface provide by tubes and/or cylinders of porous metallic substrates.

Stainless steel substrates, both polished and as-is, when coated with a single coating-sintering cycle, provide sintered coating thickness estimated to be about 2-3 μm. Both SEM analysis and leak test showed the presence of defects in the coating. These defects may be caused by the rapid evaporation of the organic solvent during sintering, giving rise to pin-holes/defects inside the coating.

Subsequently, multiple coatings were performed on additional substrates. The coating process involved soft baking at 150° C. in air, sintering @ 850° C. in $N_2$ and was repeated for 3 cycles for a second batch of samples, and for 5-cycles for a third batch of samples.

Evaluation of the samples that were subjected to multiple coating cycles showed leak tight (<0.5 sccm $N_2$ leak) performance, which indicated that multiple coatings reduce leakage.

As previously related, one of the useful thermal processing methods utilized herein involves sintering. In one example, sintering was conducted in a programmable tube furnace with continuous purge of $N_2$ or ultra high purity (UHP) $N_2$. The typical sintering treatment was a ramp up and down rate of 3° C./min with a 1 hr soak at 900° C. Soak temperatures of 850 and 950° C. were also used in some instances. The choice of the soak temperature was a compromise between the need for adequate sintering of the Pd/Ag film without over-densification of the exemplary stainless steel support. It is also desired to maintain a high enough soak temperature that alleviate concerns of Pd oxidation (via decomposition of PdO). The ramp rates were based on rates that were being used for another material (that was sensitive to thermal shock and expansion mismatch). Faster ramp rates such as 10 to 100 Degrees/minute, perhaps enabling longer soak times, such as about 2 to about 10 hours and/or higher soak temperature, such as about 900 to 1000 degrees C, are also useful parameters for these membranes.

Once the thin leak-tight coatings are deposited upon the various supports/substrates (polished/unpolished, etc.) scanning electron microscopy (SEM), X-ray photelectron spectroscopy (XPS) and room temperature $N_2$ permeance (leakage) measurements are conducted to facilitate characterization. Elevated temperature hydrogen permeation measurements and some room temperature leakage measurements are also conducted.

As mentioned above, laser direct write method (MAPLE-DW or LDW) was utilized to deposit Pd/Ag layers on porous metal substrates. This deposition method was found to provide extremely uniform edge-to-edge coating of the supports. As-deposited (un-sintered) layers were found to be highly porous, and sintering of a single layer created openings or defects in the membrane layer. $N_2$ leakage measurement on single layer membranes showed very low leakage in the as-deposited sample, presumably due to remnant organic material. Upon sintering, permeance increases by approximately three orders of magnitude, reaching a level similar to what is expected for the bare support. Sintering at 900° C. appears to be better than sintering at 850° C. as it results in a higher degree of densification. Results of a single LDW layer on the ion beam treated supports were similar, i.e. leakage increased dramatically with initial sintering to a level that was close to the support. These results indicated that multiple deposition layers are desired to provide complete coverage after sintering.

A set of samples were produced using the MAPLE-DW (direct write process) that were subjected to 3-treatment cycles and 5-treatment cycles (coating-soft baking-sintering). Both coarse ("as-is") and ion beam treated stainless steel supports were coated. The samples were exposed to 850° C. in nitrogen between coatings to remove organics and to partially densify the previously deposited material. Sintering after the final layer was conducted at 900° C. SEM analysis was conducted and microstructure of representative coated samples studied. The 3-coated membrane was deposited on an ion-beam treated support and had a thickness of approximately 5-6 microns. A 5-coat sample was deposited onto a coarse support, its thickness is approximately 12 μm (FIG. 6).

For the purposes of the final application of these membranes (use in membrane reformers), desired leakage levels are such that a 99+% $H_2$ permeate could be expected from a 75% $H_2$/25% $N_2$ feed at 600° C. and 70 psi. Using permeability relationships for Pd/Ag alloys from the literature to estimate $H_2$ permeation through the Pd alloy (with an estimated membrane thickness), one can calculate the leakage that is tolerable. Alternatively, for a particular set of membrane/support leakage data, a calculated estimate of the purity and permeation rate of permeate can be made. While permeation is affected by the estimated permeance (leakage) of the support, which is only known approximately, the permeate purity should not be very sensitive to the support under these conditions.

In order to test $H_2$ permeation a feed gas of 75% $H_2$/25% $N_2$ is metered through mass flow controllers (Brooks 5850E). A back pressure regulator (Tescom) is used to set the pressure on the feed side of the hydrogen separation membrane provided by the deposition methods described herein. The permeate side was at atmospheric pressure. No sweep gas is used during permeation testing. Mass balance closures during permeation testing are typically within 5%. Hydrogen permeation through commercial Pd/Ag foils (25 microns in thickness) is evaluated as a means of validating the set-up and experimental protocols. Gas analysis is performed using a Shimadzu GC-17A gas chromatograph that was equipped with a TCD, FID and a methanizer. Both permeate and membrane reject streams were analyzed simultaneously using two different gas chromatographs. Elevated temperature $H_2$ permeation measurements, and XPS analysis are also conducted on hydrogen separation membranes provided by the present disclosure to test hydrogen permeance.

Formation of an oxide barrier layer prevents contamination of the formed thin leak tight coating by iron and any other component from the stainless steel substrate. Inter metallic diffusion between the stainless steel support/substrate and a Pd/Ag coating can drastically reduce hydrogen permeation. As mentioned earlier, prior to coating, the supports are exemplarily treated at 900° C. in air to form an oxide layer to serve as a barrier against such inter metallic diffusion.

Carbon contamination can reduce hydrogen permeation rates, but it is not expected to cause total stoppage of hydrogen permeation. In fact, one would expect that surface carbon would gasify to methane at 550 to 600° C. when exposed to hydrogen.

One can expect reduction of the surface oxides during a lengthy exposure to hydrogen, which may be provided during permeation testing, where membranes are exposed to a 62% air-38% $H_2$ gas mixture for about 30 minutes, to burn out any carbon in situ. This is followed by exposure to 75% $H_2$-25% $N_2$ gas mixture at 600° C. for about 12 h. Other methods for burning off carbon may also be utilized such as steaming using a 50/50 mix of hydrogen and steam.

Exemplary thermal processing (between coatings) in air at low temperatures (<350° C.), provides total removal of organics removed without oxidizing the Pd/Ag coating. Soak temperatures would likely be in the vicinity of 350° C. This low temperature will also not sinter the metal layer or the support significantly. In particular embodiments, after multiple deposition cycles, single step sintering of the membrane layer is conducted, utilizing higher soak temperatures such as 1000° C. and employing faster ramp rates 10 to 100° C./minute (the exception being a possible soak for organic removal).

Substrates containing a leak-tight Pd/Ag coating, are to be subjected to hydrogen permeation tests. Once demonstrated hydrogen permeation at high purity levels through the Pd/Ag coated substrates (composite membranes) is shown, the next step is to subject these membranes to long-term stability tests (at least 250 h) and stability to thermal cycling (at least 10 cycles from cold to 600° C.). These tests conducted using a 75% $H_2$/25% $N_2$ feed and performed in a hydrogen permeation apparatus.

Hydrogen permeation and purity are monitored as a function of time. Possible failure modes may include contamination of the Pd/Ag coating by intermetallic diffusion from the support that would result in decreasing hydrogen permeation (life time tests) and/or peeling-off or flaking of the coating during the thermal cycling tests. Problems arising from intermetallic diffusion can be solved by a proper choice of diffusion barrier, porous support and treatment protocols during the coating. Employing an oxide diffusion barrier provides for minimal diffusion of stainless steel constituents such as Fe and Cr into the Pd/Ag coating.

It will be understood that the above description is susceptible to various modifications, changes and adaptations can be made thereto without departing from the spirit of the disclosure. For example, while embodiments having substrates/supports onto which the thin hydrogen separation membranes are shown having a planar configuration, other configurations of porous substrate, such as cylindrical/tubular configurations are also desirable. In an exemplary configuration, a hydrogen separation membrane is disposed in accordance with the teachings present herein, on the outer surface of the porous metallic cylinder and hydrogen permeates through the membrane and through the porous substrate into an inner portion of the tube/cylinder, where hydrogen is thereby conducted to a desired destination, such as a storage tank or fuel cell, for example. Accordingly, it is not intended that the scope of the present invention be limited to the disclosure/description provided above.

REFERENCES

1. T. L. Ward and T. Dao, "Model of hydrogen permeation behavior in palladium membranes", J. Mem. Sci. 153, 211-231 (1999).
2. G. J. Grashoff, C. E. Pilkington and C. W. Corti, "The purification of hydrogen", Plat. Met. Rev. 27(4), 157-169 (1983).
3. A. G. Knapton, "Palladium alloys for hydrogen diffusion membranes", Plat. Met. Rev. 21, 44-50 (1977).
4. G. Holleck, "Diffusion and solubility of hydrogen in palladium and palladium-silver alloys", J. Phys. Chem. 74(5), 503-511 (1970).
5. T. C. Pluym, S W. Lyons, Q. H. Powell, A. S. Gurav, T. T. Kodas, L. M. Wang and H. D. Glicksman, "Palladium metal and palladium oxide particle production by spray pyrolysis", Mat. Res. Bull. 28, 369-376 (1993).
6. K. Nagashima, T. Himeda, and A. Kato, "Properties of conductive films made from fine spherical silver-palladium alloy particles", J. Mater. Sci. 26, 2477-2482 (1991).
7. K. Nagashima, M. Wada, and A. Kato, "Preparation of fine Ni particles by the spray pyrolysis technique and their film forming properties in the thick film method", J. Mater. Res. 5(12), 2828-2834 (1990).
8. Shu, B. P. A. Grandjean, A. Van Neste, S. Kaliaguine, "Catalytic palladium-based membrane reactors: a review, Can. J. Chem. Eng. 69, 1036-1060 (1991).
9. S. S. Cole, Jr. "Oxidation and reduction of palladium in the presence of silver", J. Am. Ceram. Soc. 68 (4), C106-C107 (1985).
10. S F. Wang and W. Huebner, "Thermodynamic modeling of equilibrium subsolidus phase relation in the Ag—Pd—$O_2$ system", J. Amer. Ceram. Soc. 74(6), 1349-1353 (1991).

11. P. Mardilovich, Y. H. Ma and Y. She, "Hydrogen gas-extraction module and method of fabrication", U.S. Pat. No. 6,152,987.
12. J. Shu, A. Adnot, B. P. A. Grandjean, S. Kaliaguine, "Structurally stable composite Pd—Ag alloy membranes: Introduction of a diffusion barrier", Thin Solid Films, 286, 72-79 (1996).
13. V. M. Gryaznov, O. S. Serebryannikova, Yu. M. Serov, "Prepartion and catalysis over Pd composite membranes" Appl. Catal. A: General, 96, 15-23, 1993.

We claim:

1. A method for providing a hydrogen separation membrane upon a porous metallic substrate, comprising;
    providing the substrate having a surface;
    subjecting said surface to at least one surface treatment comprising a polishing step whereby the surface is smoothed and whereby bulk properties of the substrate remain unchanged; and
    forming said hydrogen separation membrane upon said surface of the substrate by performing a plurality of deposition cycles, each deposition cycle comprising
        disposing upon said surface a composition,
        forming a coating on said surface of the substrate by a laser direct-write process utilizing said composition,
        subjecting the coating to soft baking, and
        subjecting the coating to sintering;
    wherein said hydrogen separation membrane provides permeance of hydrogen therethrough;
    wherein said composition is a metallic ink having a metallic component and a carrier component, said metallic component comprising at least at least one of palladium, a palladium alloy, and a palladium and silver alloy;
    wherein the soft baking substantially removes the carrier component from the coating; and
    wherein the sintering substantially densifies and mends the metallic component of the coating to provide substantially complete coverage of the surface without substantial openings or defects in the coating.

2. The method of claim 1, wherein said composition providing said coating is comprised of at least one of palladium or palladium alloy.

3. The method of claim 1, further comprising the step of providing a diffusion barrier upon said surface after subjecting said surface to said surface treatment, wherein said diffusion barrier is configured to allow diffusion of hydrogen and prevent diffusion of intermetallic constituents.

4. The method of claim 3, further comprising the step of etching said provided diffusion barrier prior to disposing said composition upon said surface.

5. The method of claim 1, wherein said polishing step utilizes a method selected from the group consisting of shot peening, ion-beam treatment, plasma deposition of metals and vapor deposition of metals.

6. The method of claim 4, wherein said etching step employs etching with at least one of nitric acid, hydrochloric acid and pickling solutions.

7. The method of claim 1, wherein said hydrogen separation membrane, disposed upon said substrate, is less than about 20 microns thick.

8. The method of claim 1, wherein said hydrogen separation membrane, disposed upon said substrate, is about 2 to about 10 microns thick.

9. The method of claim 1, wherein said hydrogen separation membrane, disposed upon said substrate, is about 5 to about 10 microns thick.

10. The method of claim 1, wherein said metallic component of said metallic ink is produced by an aerosol decomposition process.

11. The method of claim 1, wherein said metallic component has a palladium content of about 70 to about 78% by weight.

12. The method of claim 1, wherein said metallic component has a palladium content of about 75 to 77% by weight.

13. The method of claim 1, wherein said metallic component of said metallic ink comprises about 25% palladium and silver mix and about 75% carrier, by weight respectively, wherein said palladium and silver mix is provided in a ratio of about 75% palladium to about 25% silver, by weight respectively.

14. The method of claim 1, wherein said metallic component of said metallic ink comprises about 5% to 50% palladium and silver mix and about 50% to 95% carrier, by weight respectively, wherein said palladium and silver mix is provided in a ratio of about 70% to 78% palladium to about 22% to 30% silver, by weight respectively.

15. The method of claim 1, wherein at least one of said soft baking and said sintering is carried out in an environment having a partial pressure of oxygen between about $10^{-2}$ atm and $10^{-5}$ atm.

16. The method of claim 1, wherein at least one of said soft baking and said sintering is carried out in a lean hydrogen gas atmosphere having less than about 10% hydrogen by weight.

17. The method of claim 1, wherein said sintering comprises localized sintering of the coating and not an underlying support, wherein said localized sintering of the coating utilizes an ion or laser beam.

18. The method of claim 1, wherein said substrate is cylindrical or tubular.

19. The method of claim 1, wherein the plurality of deposition cycles comprises three deposition cycles.

20. The method of claim 1, wherein the plurality of deposition cycles comprises five deposition cycles.

21. The method of claim 1, wherein subjecting the layer of the coating to soft baking comprises soft baking at about 150 degrees C. to less than about 350 degrees C.

22. The method of claim 1, wherein subjecting the coating to sintering comprises sintering the coating at about 850 degrees C. to about 1000 degrees C.

23. The method of claim 1, wherein subjecting the coating to sintering comprises conducting the sintering in $N_2$ by
    heating at a rate of about 3 degrees C. per minute to a soak temperature of 850° C. or 900° C. or 950° C.;
    soaking for 1 hour; then
    cooling at a rate of about 3 degrees C. per minute.

24. The method of claim 1, wherein subjecting the coating to sintering comprises
    heating at a rate of about 10 to about 100 degrees C. per minute; and
    soaking for about 2 to about 10 hours at about 900 degrees C. to about 1000 degrees C.

25. The method of claim 1, wherein the formed hydrogen separation membrane substantially uniformly covers the surface edge-to-edge.

26. A hydrogen separation membrane comprising:
    a coating disposed upon a surface of a substrate;
    wherein said coating transports hydrogen;
    wherein the substrate is of a porous metal, said surface of the substrate being polished by a surface treatment whereby the surface is smoothed and whereby bulk properties of the substrate remain unchanged;
    wherein said coating is provided to said substrate by a laser direct-write process utilizing a metallic ink having a metallic component and a carrier component, said metallic component comprising at least at least one of palladium, a palladium alloy, and a palladium and silver alloy; and wherein said coating is subject to thermal processing
wherein the thermal processing comprises
soft baking, the soft baking rendering the coating substantially free of the carrier component, and
sintering, the sintering rendering the metallic component densitied and mended to provide substantially complete coverage of the surface without substantial openings or defects in the coating.

27. The hydrogen separation membrane of claim 26, wherein said polished substrate is treated to include a diffusion barrier between said polished substrate and said coating, wherein said diffusion barrier is configured to allow diffusion of hydrogen and prevent diffusion of intermetallic constituents.

28. The hydrogen separation membrane of claim 27, wherein said diffusion barrier is etched.

29. The hydrogen separation membrane of claim 26, wherein said polishing is accomplished by at least one of shot peening, ion-beam treatment, plasma deposition of metals and vapor deposition of metals.

30. The hydrogen separation membrane of claim 26, wherein said coating has a thickness of less than about 20 microns.

31. The hydrogen separation membrane of claim 26, wherein said coating has a thickness of between about 2 to 10 microns.

32. The hydrogen separation membrane of claim 26, wherein said metallic component of said metallic ink is provided by an aerosol decomposition process.

33. The hydrogen separation membrane of claim 26, wherein said metallic component of said ink is comprised of an alloy having between about 70 to about 78% palladium by weight.

34. The hydrogen separation membrane of claim 26, wherein said metallic component of said ink is comprised of an alloy having between about 75 to about 77% palladium by weight.

35. The hydrogen separation membrane of claim 26, wherein said metallic component of said metallic ink is comprised of about 25% palladium and silver mix and about 75% carrier, by weight respectively, wherein said palladium and silver mix is provided in a ratio of about 75% palladium to about 25% silver, by weight respectively.

36. The hydrogen separation membrane of claim 26, wherein said metallic component of said metallic ink is comprised of about 50% palladium and silver mix and about 50% carrier, by weight respectively, wherein said palladium and silver mix is provided in a ratio of about 70% palladium to about 30% silver, by weight respectively.

37. The hydrogen separation membrane of claim 26, wherein said substrate is cylindrical or tubular.

38. The hydrogen separation membrane of claim 26, wherein the sintering comprises localized sintering which sinters the coating and not an underlying support, wherein said localized sintering of the coating utilizes an ion or laser beam.

39. The hydrogen separation membrane of claim 26, wherein the coating substantially uniformly covers the surface of the substrate edge-to-edge.

* * * * *